Feb. 9, 1943.　　　G. S. FRASER　　　2,310,685
WHARVE-DRIVEN FLYER SPINDLE
Filed March 30, 1942　　　2 Sheets-Sheet 1

Patented Feb. 9, 1943

2,310,685

UNITED STATES PATENT OFFICE 2,310,685

WHARVE-DRIVEN FLIER SPINDLE

Gordon Scott Fraser, Arbroath, Angus, Scotland, assignor to Douglas Fraser & Sons Limited, Arbroath, Angus, Scotland, a corporation of Great Britain Application March 30, 1942, Serial No. 436,805
In Great Britain April 10, 1941

3 Claims. (Cl. 57—115)

This invention relates to improvements in wharve-driven flier spindles for machines for use in the manufacture of rove and yarn from jute and like fibres, and more particularly to a flier spindle unit of the type including a vertical hollow flier spindle carrying at its lower end a suspended flier and, between its ends, a hollow driving wharve, a bearing housing which is surrounded by the wharve and within which the spindle is journalled in upper and lower anti-friction bearings, each of said bearings including an inner race embracing the spindle and an outer race supported by the housing, and a rotating lubricant sump at or within the lower end of the wharve from which liquid lubricant, e. g., oil, is fed to the bearings.

The present invention consists of a wharve-driven flier spindle unit of the type referred to including a stationary member located within the sump and forming, in conjunction with a part rotating with the spindle, a lubricant trap along which lubricant is frictionally swept and which communicates with a duct through which lubricant is fed to the upper bearing.

The stationary member may be constituted by a foot of segmental shape integral with and depending from the housing, said member presenting an arcuate outer lateral wall which is positioned close to part of a circumferential wall of the sump and of which a part contacts, or almost contacts, with said circumferential wall at a point in register with an outlet port leading to the duct, the trap being formed between said arcuate lateral wall and said circumferential wall and communicating with said port.

Alternatively, the trap may be formed between an arcuate inner lateral wall of the stationary member and a cylindrical part of or on the spindle.

The duct may be drilled in the housing.

The lubricant is led from the upper end of the duct into the lower side or, it may be, the upper side, of the upper bearing, whence the lubricant drains through an annular space between the bore of the housing and the exterior of a tubular distance piece surrounding the spindle and interposed endwise between the inner races of the bearings, and flows through the lower bearing back into the sump, the arrangement thus providing a simple circulating system for the lubricant.

Figure 1:
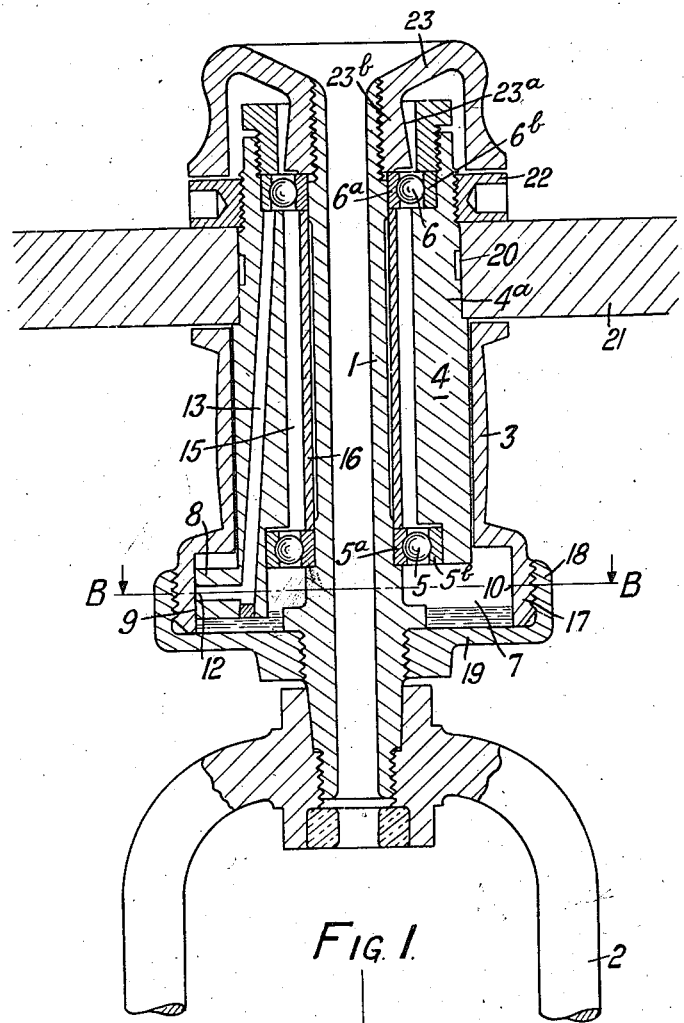
Figure 2:
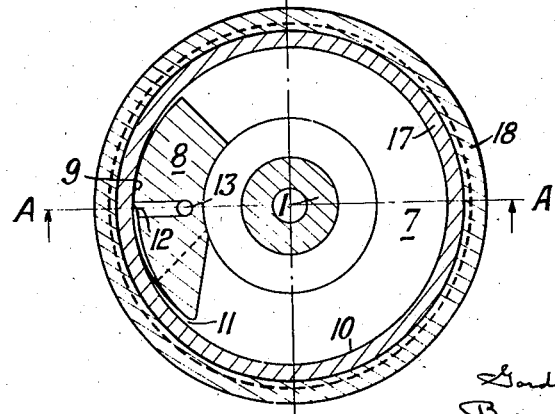
Figure 3:
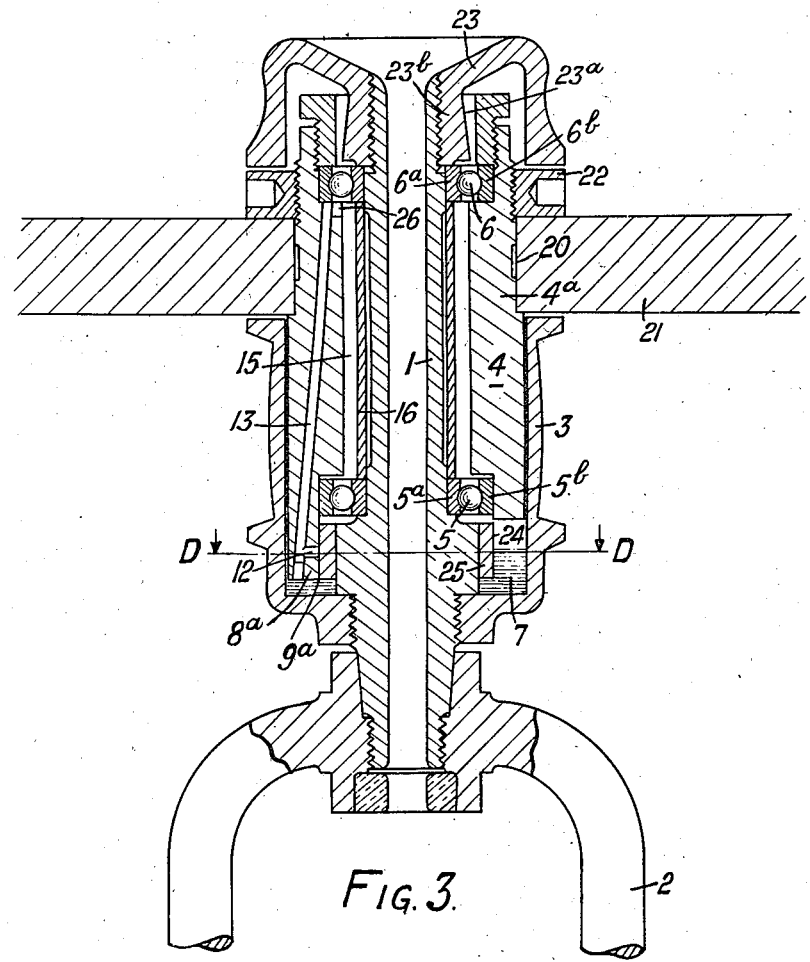

Two wharve-driven flier spindle units according to the invention are illustrated in the accompanying drawings in which Fig. 1 is a vertical axial section on the line A—A of Fig. 2, and Fig. 2 a horizontal section on the line B—B of Fig. 1, of one embodiment; Fig. 3 is a vertical axial section on the line C—C of Fig. 4, and Fig. 4 a horizontal section on the line D—D of Fig. 3, of the second embodiment.

The wharve-driven flier spindle unit shown in Figs. 1 and 2 of the drawings includes a vertical hollow flier spindle 1 provided at its lower end with a suspended flier 2 and carrying a hollow driving wharve 3. 4 denotes a bearing housing which is surrounded by the wharve 3 and within which the spindle 1 is journalled in a lower anti-friction bearing 5 and in an upper anti-friction bearing 6, said bearings including inner races $5^a$, $6^a$, respectively, embracing the spindle 1, and outer races $5^b$, $6^b$, respectively, supported by the housing 4. 7 denotes a rotating oil sump within the lower part of the wharve 3 from which oil is fed to the bearings.

8 denotes a stationary member carried by the housing 4, depending into the sump 7, and presenting an outer arcuate lateral wall 9 forming, with part of the circumferential internal cylindrical wall 10 of the sump, a narrow oil trap 11 which terminates in an oil outlet port 12 formed in the member 8 and located close to the wall 10, said port 12 communicating with an oil duct 13 leading to the upper bearing 6. The construction is such that the rotating sump 7 frictionally sweeps oil into and builds up oil pressure within the trap 11 whereby the oil is fed upwardly through the duct 13 to the bearing 6.

The member 8 is constituted by a foot of segmental shape integral with and depending from the lower end of the housing 4. The arcuate wall 9 is positioned close to the circumferential wall 10 and contacts, or almost contacts, with said wall 10 at a point in register with the port 12.

The trap 11 is formed between the walls 9 and 10, being partially constituted by a channel-shaped undercut or groove, formed in the member 8, e. g., a groove measuring about $\frac{1}{16}$ inch in radial depth and about $\frac{1}{8}$ inch wide, and leading into the port 12.

In order to prevent oil from centrifugally surmounting the member 8 and thus tending to leak outwardly between the housing 4 and the wharve 3, the leading end portion of the member 8 may be so shaped that it ploughs into the oil and diverts the oil under the member 8.

The duct 13 is drilled in the housing 4. As shown, it leads to the under side of the upper bearing, but it may lead to the upper side.

The oil passes from the upper end of the duct 13 into the lower end of the upper bearing 6, whence the oil drains through an annular space 15 between the bore of the housing 4 and the exterior of a tubular distance piece 16 surrounding the spindle 1 and interposed endwise between the inner races 5ª, 6ª of the bearings, and flows through the lower bearing 5 back into the sump 7, the arrangement thus providing a simple circulating system for the oil. Valve or other means may be provided to permit regulation of the flow of oil upwardly through the duct 13.

The sump 7 is formed within an annular flange 17 integral with and depending from the wharve 3 and screwthreaded into an annuluar upstanding flange 18 of a cup-shaped boss 19 secured on the spindle 1 and forming the base of the sump.

The wharve 3 proper is in the form of a sleeve closely surrounding the housing 4.

The housing 4 is adapted to be mounted in an opening 20 in a carrying rail 21, an upper portion 4ª of the housing serving as a spigot penetrating the opening 20 and being provided with a rail-engaging nut 22. A skirted nut 23 is secured on the upper end of the spindle. The external periphery 23ª of the boss 23ᵇ of the nut 23 increases in diameter conically downwards so as to throw oil centrifugally downwards and thus to minimise leakage of oil.

As will be understood, a wharve-driven flier spindle unit constructed as described is a self-contained unit and may be removed from and replaced in position on the rail 21 with removal of the nuts 22 and 23 only.

Figure 4:
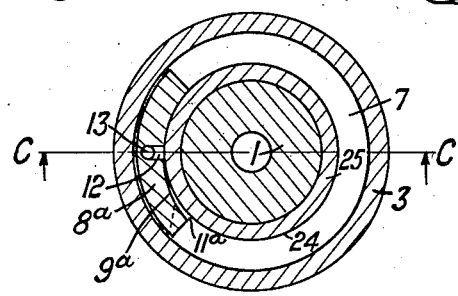

In the modification shown in Figs. 3 and 4 the stationary member 8ª presents an arcuate inner lateral wall 9ª which forms, with a cylindrical part 24 of the spindle 1, a convergent lubricant trap 11ª terminating in a port 12 communicating with an uprising duct 13. The part 24 is constituted by the circumferential surface of a ring 25 secured on the spindle 1 and dipping into the lubricant in the sump 7. In this construction, the sump 7 is formed within an integral base portion of the wharve 3. If required, a port 26 may be provided at the upper end of the duct 13, below the bearing 6. In other respects the unit is similar to that shown in Figs. 1 and 2.

I claim:

1. A flier spindle unit comprising a hollow vertical spindle, a flier suspended from the lower end of said spindle, a hollow driving wharve fixed to said spindle between the upper and lower ends of said spindle, a lubricant-containing sump at the base of said wharve, said sump rotating with said wharve, a bearing housing surrounded by said wharve, upper and lower spindle bearings within said housing, said housing formed with a duct extending to said upper bearing, said housing also formed with a port open to said sump and communicating with said duct, a stationary member located within said sump, and a part rotating with said spindle and forming with said stationary member a lubricant trap along which lubricant is frictionally swept by said rotating part and by way of said port to said duct and through said duct to said upper bearing.

2. A wharve-driven flier spindle unit as claimed in claim 1 in which the lubricant trap is formed between an arcuate outer lateral wall of the stationary member and part of a circumferential internal wall of the sump.

3. A wharve-driven flier spindle unit as claimed in claim 1 in which the lubricant trap is formed between an arcuate inner lateral wall of the stationary member and a ring on the spindle.

GORDON SCOTT FRASER.